Oct. 15, 1940.          B. R. BENJAMIN          2,217,888
                         PLOW BOTTOM
                       Filed May 25, 1939
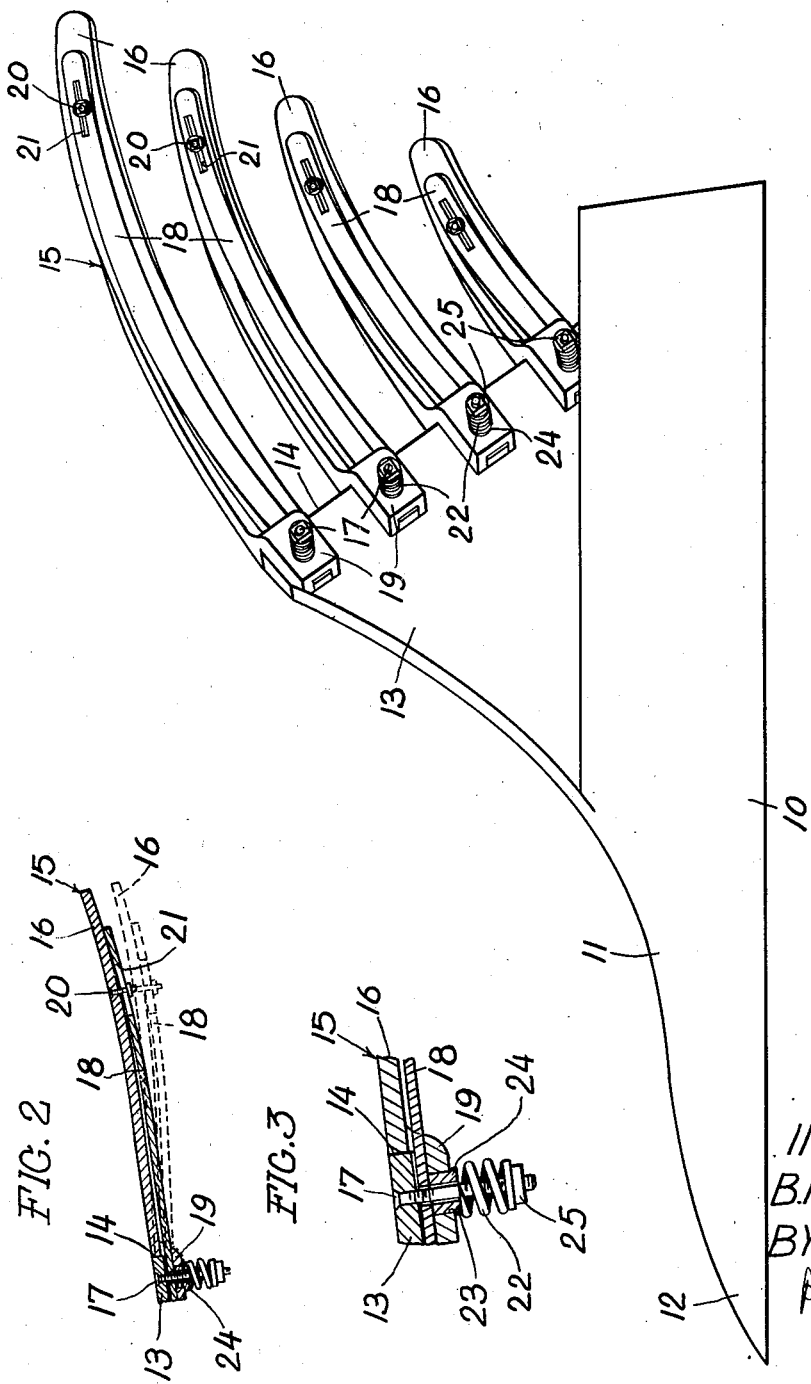
INVENTOR
B.R. BENJAMIN
BY
Paul O. Pippel
ATTY.

Patented Oct. 15, 1940

2,217,888

UNITED STATES PATENT OFFICE 2,217,888

PLOW BOTTOM

Bert R. Benjamin, Oak Park, Ill., assignor to International Harvester Company, a corporation of New Jersey Application May 25, 1939, Serial No. 275,630

1 Claim. (Cl. 97—123)

This invention relates to a plow bottom and more particularly to a plow bottom adapted to be used in plowing at a higher rate of speed than that at which plowing is ordinarily done.

In general, the fundamental difference between an ordinary plow bottom and a so-called high-speed bottom is in the curvature of the mold-board. In ordinary plows, the mold-board curvature is formed about a comparatively short radius, and the soil cut out by the plow in forming the furrow is adequately turned at the side of the furrow by the mold-board. If such a bottom were used in plowing at higher speeds, the curvature of the mold-board is such that the soil would be thrown transversely across the field into adjacent furrows and the draft on the plow would be materially increased. In a plow of the high-speed type, the mold-board curvature is altered by increasing the length of the radius about which said curvature is formed. This provision gives the mold-board a comparatively longer extent furrow-wise and the mold-board adequately turns the soil to the side of the furrow. If, however, the high speed bottom is operated at slower speeds, as is often necessitated by varying soil conditions, the mold-board curvature is inadequate to turn the soil properly. It is, therefore, desirable to provide a plow bottom which may be used advantageously in either high-speed or low-speed plowing.

The principal object of the present invention is to provide an improved plow bottom having a mold-board part which is adapted to accommodate itself to varying speed ranges of plowing and which further adapts itself to varying soil conditions.

An important object is to provide the improved plow bottom generally in the form of an ordinary plow, but having a rearward mold-board part resiliently mounted with respect to the other parts of the bottom, so that said mold-board part may yield transversely of the furrow when the plow is operated at higher speeds.

Another important object is to provide such mold-board part as a plurality of individually and resiliently mounted slats.

These and other important objects are achieved in one preferred form of the invention by the provision of a plow bottom comprising a forward share part carrying rigidly thereon a rearwardly and upwardly extending supporting portion in the form of a forward mold-board part. A rearward mold-board part is resiliently associated with the forward mold-board part and extends rearwardly and forms a continuation thereof. In a preferable construction the movable mold-board part is in the form of a plurality of individually mounted slats associated resiliently with individual resilient means in the form of leaf-springs. As an added feature of the invention, a second resilient means is associated respectively with each leaf-spring for the purpose of adjusting the pressure imparted to the individual slats. The leaf-springs normally hold the rearward mold-board part in a position generally simulating the mold-board part of an ordinary plow used generally for slower plowing. When the speed of the plow is increased, the cut out soil is more rapidly displaced rearwardly and the rearward mold-board part is enabled by the resilient means to yield to this pressure, thus simulating the mold-board of a so-called high speed bottom.

The important objects and features of the invention will be more fully understood from an examination of the following detailed description taken in conjunction with the accompanying sheet of drawing, in which:

Figure 1 is a side elevational view of the improved plow bottom as viewed from the land side thereof;

Figure 2 is a sectional view through the rearward mold-board part showing its relation to the resilient means and the forward mold-board part; and, Figure 3 is an enlarged sectional view showing the manner of mounting the mold-board part and leaf-spring on the forward mold-board part, illustrating also the relation thereto of the additional adjustable resilient means.

The plow bottom chosen for the purposes of illustration comprises generally a land-side 10 joined adjacent its forward end to a forward share part 11, which terminates in a forward point 12. The share 11 has integrally formed therewith or otherwise rigidly secured thereto a rearwardly and upwardly extending supporting portion 13, which serves generally to constitute a forward mold-board part. The portion 13 includes an inclined, upstanding rear edge 14, at which a rearward mold-board part 15 is mounted. This latter mold-board part is movably carried by the forward mold-board part for movement transversely of the furrow, as generally indicated in Figure 2, and preferably comprises a plurality of individually mounted slats 16, which as a whole generally simulate the rearward mold-board part of an ordinary plow bottom.

Each slat 16 is movably mounted on the forward mold-board part 13 generally along its rearward edge 14. The means for mounting each slat comprises a bolt 17 which passes through the forward mold-board part 13, through a leaf-spring 18 and through an integral portion 19 of a slat 16. This portion 19 is offset with respect to the general extent of the slat, so that the outer surface of the slat is substantially coincident with the outer surface of the mold-board part 13, thus generally forming a yielding continuation thereof. Each leaf-spring 18 is substantially equal in length to its related slat and is associated at its rearward end with the rearward end of the slat through the medium of a bolt 20 passing through an opening in the slat and through a longitudinally extending slot 21 in the leaf-spring. The forward end of the spring 18 is, as aforesaid, associated with the bolt 17, which comprises part of a securing means which includes, as an additional part thereof, a second resilient means in the form of a coil spring 22. The portion 19 of the slat 16 is formed with an enlarged bore 23 within which is fitted a plug member 24 engaged by the spring 22. The securing means is adjustably and resiliently maintained in position by a nut 25 threaded on the end of the bolt 17. The plug 24 abuts against the inner face of the spring 18 and is formed with an annular flange which is spaced inwardly from the inner face of the integral slat portion 19. By this means the spring 22 is enabled to act directly and separately on the leaf-spring 18 at its forward end.

The general association between the leaf-spring 18 and the slat 16 is indicated in Figures 2 and 3, whereat it is shown that an extreme forward portion of the spring abuts the land-side or inner face of the mold-board part 13, the spring curving slightly rearwardly in spaced relation to the slat and contacting same at its rearward end. In a preferred construction there is little, if any, initial pressure in the leaf-springs 18, and the pressure of the coil springs 22 may be adjusted as desired. In this manner the resilient pressure urged against the slats 16 is mainly through the coil springs 22 and the first yielding movement of the slats, when the bottom is operated at higher speeds, is opposed by the springs 22. The manner of mounting the slats 16 on the bolts 17 provides sufficient movement therebetween to allow free yielding movement of the slats. Continued transverse movement of the slats caused by pressure of the soil, because of its more rapid displacement by the share 11, is opposed by the leaf-springs 18. It is thus possible to adjust the yieldability of the slats through the medium of adjusting the nut 25 to increase or decrease the compression on the coil spring 22. It will be understood, of course, that the slats may be mounted on the mold-board part 13 and associated therewith for yielding movement through the medium of either the leaf-springs or coil springs. In a preferred construction, both resilient means are utilized.

As previously mentioned, each slat 16 is formed with a transversely offset portion 19. As best shown in Figure 3, a portion of the slat is thus adapted to engage the rearward edge 14 of the mold-board part 13 and thus the movement of each slat is limited in one direction by the abutment of a portion of the slat against the edge 14. The leaf-springs 18 are preferably formed of lengths substantially equal to the respective slats with which they are associated in order that the slats may be adequately supported, even though they have become worn by continued use. It will be appreciated that considerable wear in the slats decreases the thicknesses thereof and would, except for the equally long springs 18, have some yielding movement in and of themselves. This movement is found generally undesirable in that it is in nowise controlled.

In the operation of the improved plow bottom at lower plowing speeds, the function thereof is substantially that of an ordinary plow bottom. When the plow speed is increased, the soil cut out by the share is more rapidly displaced rearwardly, at which time the yieldable, rearward mold-board part 15 yields transversely of the furrow to accommodate the increased pressure thereon. It is well known that plow bottoms may be operated at a higher speed in some soil than in other soil, and it is also well known that such soil conditions may be present in the same field. In this respect, the improved plow bottom may be operated at varying speeds according to its adaptability to handle the soil through which it is forming furrows.

The improved plow bottom structure presented in the foregoing description and in the accompanying sheet of drawings is a preferred form of the invention, and it will be understood that numerous modifications and alterations may be made therein without departing from the spirit and scope of the invention as defined in the appended claim.

What is claimed is:

A plow bottom comprising a forward share part having a rearward upstanding supporting portion having a landside face, a rearward mold-board part movably carried by said portion at its landside face and extending rearwardly therefrom and simulating a continuation thereof, being mounted for movement substantially transversely of the bottom, a leaf-spring disposed at the landside face of the supporting portion and associated therewith and with the mold-board part, and securing means securing both the mold-board part and the leaf-spring to the supporting part, said means including an adjustable resilient member separately engaging the leaf-spring.

BERT R. BENJAMIN.